US009906382B2

(12) United States Patent
Huang

(10) Patent No.: US 9,906,382 B2
(45) Date of Patent: Feb. 27, 2018

(54) NETWORK ENTITY FOR PROGRAMMABLY ARRANGING AN INTERMEDIATE NODE FOR SERVING COMMUNICATIONS BETWEEN A SOURCE NODE AND A TARGET NODE

(71) Applicant: Huawei Technologies Co., Ltd., Shenzhen, Guangdong (CN)

(72) Inventor: Yangcheng Huang, Dublin (IE)

(73) Assignee: Huawei Technologies Co., Ltd., Shenzhen (CN)

( * ) Notice: Subject to any disclaimer, the term of this patent is extended or adjusted under 35 U.S.C. 154(b) by 160 days.

(21) Appl. No.: 14/869,634

(22) Filed: Sep. 29, 2015

(65) Prior Publication Data

US 2016/0099860 A1    Apr. 7, 2016

(30) Foreign Application Priority Data

Oct. 1, 2014    (EP) .................................... 14187308

(51) Int. Cl.
| | |
|---|---|
| *H04L 12/66* | (2006.01) |
| *H04L 12/721* | (2013.01) |
| *H04L 12/64* | (2006.01) |
| *H04L 12/713* | (2013.01) |

(52) U.S. Cl.
CPC .......... *H04L 12/66* (2013.01); *H04L 12/6418* (2013.01); *H04L 45/123* (2013.01); *H04L 45/70* (2013.01); *H04L 45/586* (2013.01)

(58) Field of Classification Search
CPC ... H04L 45/586; H04L 45/70; H04L 12/6418; H04L 45/123; H04L 12/66
See application file for complete search history.

(56) References Cited

U.S. PATENT DOCUMENTS

| | | | |
|---|---|---|---|
| 2007/0081460 A1* | 4/2007 | Karacali-Akyamac | ................... H04L 41/5038 370/230 |
| 2010/0157997 A1* | 6/2010 | Leinwand | ......... H04L 29/12009 370/389 |
| 2011/0214005 A1 | 9/2011 | Biran et al. | |

(Continued)

OTHER PUBLICATIONS

"Network Function Virtualization (NFV) Management and Orchestration", ETSI Group Specification, GS NFV-MAN 001 V0.6.2, Jul. 2014, 196 pages.
Network Functions Virtualisation (NFV), Network Operator Perspectives on Industry Progress, Oct. 15-17, 2013, 16 pages.

(Continued)

*Primary Examiner* — Lakeram Jangbahadur

(57) ABSTRACT

The invention relates to a network entity for programmably arranging an intermediate node for serving communications between a source node and a target node in a communication network comprising a plurality of intermediate nodes arranged in a plurality of communication paths between the source node and the target node, the network entity comprising a metric determiner for determining a first metric of a first communication path and a second metric of a second communication path from the plurality of communication paths, the metric determiner being further configured to compare the first metric and the second metric and to select the communication path which is associated with the lesser metric, and a processor being configured to select an intermediate node arranged in the selected communication path to obtain a selected intermediate node, and to programmably arrange the selected intermediate node.

22 Claims, 8 Drawing Sheets

(56) References Cited

U.S. PATENT DOCUMENTS

| | | | |
|---|---|---|---|
| 2011/0225277 A1* | 9/2011 | Freimuth | G06F 9/45558 709/223 |
| 2012/0311370 A1 | 12/2012 | Dasgupta et al. | |
| 2013/0185414 A1 | 7/2013 | Puttaswamy Naga | |
| 2013/0263120 A1 | 10/2013 | Patil et al. | |
| 2013/0268672 A1 | 10/2013 | Justafort et al. | |
| 2013/0346615 A1* | 12/2013 | Gondi | G06F 9/5016 709/226 |

OTHER PUBLICATIONS

Adrian Farrel, et al, "The Role of PCE in an SDN World", European Workshop on Software Defined Networks, 2014, 34 pages.

A. Farrel, et al., "A Path Computation Element (PCE)-Based Architecture", Network Working Group, Aug. 2006, 40 pages.

Qiang Xu, et al., "Cellular Data Network Infrastructure Characterization and Implication on Mobile Content Placement", SIGMETRICS'11, Jun. 7-11, 2011, 12 pages.

Joe Wenjie Jiang, et al., "Joint VM Placement and Routing for Data Center Traffic Engineering", 2012, 9 pages.

P. Krishnan, et al., "The Cache Location Problem", IEEE/ACM Transactions on Networking, vol. 8, No. 5, Oct. 2000, p. 568-582.

Clayman et al., "The Dynamic Placement of Virtual Network Functions", 2014 IEEE Network Operations and Management Symposium (NOMS), May 2014, 9 pages.

Basta et al., "Applying NFV and SDN to LTE Mobile Core Gateways; The Functions Placement Problem", Proceedings of the 4th Workshop on All Things Cellular: Operations, Applications, & Challenges, Aug. 2014, pp. 33-38.

* cited by examiner

NETWORK ENTITY FOR PROGRAMMABLY ARRANGING AN INTERMEDIATE NODE FOR SERVING COMMUNICATIONS BETWEEN A SOURCE NODE AND A TARGET NODE

CROSS-REFERENCE TO RELATED APPLICATION

This application claims priority to European Patent Application No. EP14187308.3, filed on Oct. 1, 2014, which is hereby incorporated by reference in its entirety.

TECHNICAL FIELD

The invention relates to the field of network function placement in communication networks.

BACKGROUND

Communication networks comprising a plurality of nodes can be structured according to a hierarchical structure, wherein there are many-to-one relationships and one-to-one relationships between the plurality of nodes within the communication network.

The plurality of nodes within the communication network is usually designed to provide fixed and pre-defined communication network functions, e.g. routing or switching functions, within the communication network. Furthermore, the plurality of nodes within the communication network is usually implemented using customized hardware appliances.

Next generation communication networks are designed to provide an increased capacity and to support a large number of communication connections. Common approaches using fixed and pre-defined communication network functions provided by a plurality of nodes within the communication network, however, limit the performance and scalability of the communication network, and can impede a flexible adaption of the structure of the communication network.

In US 20130346615, an approach for a placement of a virtual machine is described.

SUMMARY

It is an object of the invention to provide an improved effectiveness and an improved efficiency of a communication network.

This object is achieved by the features of the independent claims. Further implementation forms are apparent from the dependent claims, the description and the figures.

The invention is based on the finding that a first metric of a first communication path and a second metric of a second communication path between a source node and a target node within a communication network can be determined, and that an intermediate node arranged in the communication path associated with the lesser metric can be programmably arranged. The intermediate node can comprise a virtual machine, or a part of a virtual machine, or multiple virtual machines, wherein the virtual machine(s) can be programmably arranged to provide a communication network function, e.g. a mobility management entity (MME) function, a service gateway (sGW) function, and/or a packet gateway (pGW) function. The intermediate node may provide a single communication network function or a sequence of communication network functions. The intermediate node can be employed independently from virtualized resources, e.g. provided by virtual machines.

For determining the first metric of the first communication path and the second metric of the second communication path, a connectivity graph can be used, wherein the connectivity graph can indicate communication connections between the source node, a plurality of intermediate nodes, and the target node within the communication network. The first metric and the second metric can comprise a latency metric for communications between the source node and the target node.

According to a first aspect, the invention relates to a network entity for programmably arranging an intermediate node for serving communications between a source node and a target node in a communication network comprising a plurality of intermediate nodes arranged in a plurality of communication paths between the source node and the target node, the network entity comprising a metric determiner for determining a first metric of a first communication path from the plurality of communication paths, and for determining a second metric of a second communication path from the plurality of communication paths, the metric determiner being further configured to compare the first metric and the second metric and to select the communication path which is associated with the lesser metric to obtain a selected communication path for communications between the source node and the target node, and a processor being configured to select an intermediate node arranged in the selected communication path to obtain a selected intermediate node, and to programmably arrange the selected intermediate node. Thus, an efficient concept for programmably arranging an intermediate node for serving communications between a source node and a target node in a communication network can be realized.

The network entity can comprise an operations support system (OSS) of the communication network. The processor can be configured to programmably arrange the selected intermediate node for serving communications between the source node and the target node.

The first metric can indicate a connectivity characteristic, e.g. a latency or data rate, for communications between the source node and the target node via the first communication path. The second metric can indicate a connectivity characteristic, e.g. a latency or data rate, for communications between the source node and the target node via the second communication path. The first metric and the second metric can be real numbers, e.g. 0.2, 0.7 or 1.4. The first metric and the second metric can be non-negative. The lesser metric with regard to the first metric and the second metric can be the smaller metric with regard to the first metric and the second metric. The greater metric with regard to the first metric and the second metric can be the larger metric with regard to the first metric and the second metric.

Programmably arranging the selected intermediate node can comprise installing, updating, controlling, and/or de-installing a computer program within the selected intermediate node, wherein the selected intermediate node can be configured to execute the computer program. Programmably arranging the selected intermediate node can further comprise installing, updating, controlling, and/or de-installing the computer program within a virtual machine being comprised by the selected intermediate node.

In a first implementation form of the network entity according to the first aspect as such, the metric determiner is configured to determine the first communication path and the second communication path from the plurality of communication paths. Thus, different communication paths can be considered for selecting the intermediate node.

The first communication path and the second communication path can be determined from the plurality of communication paths by solving a shortest path challenge between the source node and the target node. The first communication path and the second communication path can be determined from the plurality of communication paths using a Dijkstra's algorithm, a Bellman-Ford algorithm, or a Viterbi algorithm.

In a second implementation form of the network entity according to the first aspect as such or the first implementation form of the first aspect, the selected intermediate node comprises a virtual machine, wherein the processor is configured to programmably arrange the virtual machine to provide a communication network function, in particular a mobility management entity function, a service gateway function, and/or a packet gateway function. Thus, the communication network function can be provided efficiently.

The virtual machine can provide a virtual resource for placing the communication network function into the selected intermediate node. The provided virtual resource can depend on a deployment scenario of the virtual machine within the selected intermediate node. The virtual machine can be part of a cluster of virtual machines within the selected intermediate node.

The virtual machine can interact with a plurality of virtual machines comprised by the plurality of intermediate nodes. The functionality of the virtual machine can be distributed within the communication network.

The communication network function can serve communications between the source node and the target node. The mobility management entity (MME) function can comprise a user equipment (UE) attach function, a user equipment (UE) detach function, and/or a user equipment (UE) handover function within the communication network. The service gateway (sGW) function or the packet gateway (pGW) function can comprise a routing function or a switching function within the communication network. The communication network function can comprise a home location register (HLR) function, a home subscriber server (HSS) function, or a domain name system (DNS) function within the communication network. The communication network function can comprise any function employed for serving communications within the communication network.

In a third implementation form of the network entity according to the first aspect as such or any preceding implementation form of the first aspect, the processor is configured to select a further intermediate node arranged in the selected communication path to obtain a further selected intermediate node, and to programmably arrange the further selected intermediate node. Thus, different intermediate nodes can be programmably arranged within the selected communication path.

The processor can be configured to programmably arrange the further selected intermediate node for serving communications between the source node and the target node.

In a fourth implementation form of the network entity according to the third implementation form of the first aspect, the further selected intermediate node comprises a further virtual machine, wherein the processor is configured to programmably arrange the further virtual machine to provide a further communication network function, in particular a mobility management entity function, a service gateway function, and/or a packet gateway function. Thus, the further communication network function can be provided efficiently.

The further virtual machine can provide a further virtual resource for placing the further communication network function into the further selected intermediate node. The provided further virtual resource can depend on a deployment scenario of the further virtual machine within the further selected intermediate node. The further virtual machine can be part of a cluster of further virtual machines within the further selected intermediate node.

The further virtual machine can interact with a plurality of virtual machines comprised by the plurality of intermediate nodes. The functionality of the further virtual machine can be distributed within the communication network.

The further communication network function can serve communications between the source node and the target node. The mobility management entity (MME) function can comprise a user equipment (UE) attach function, a user equipment (UE) detach function, and/or a user equipment (UE) handover function within the communication network. The service gateway (sGW) function or the packet gateway (pGW) function can comprise a routing function or a switching function within the communication network. The further communication network function can comprise a home location register (HLR) function, a home subscriber server (HSS) function, or a domain name system (DNS) function within the communication network. The further communication network function can comprise any function employed for serving communications within the communication network.

In a fifth implementation form of the network entity according to the first aspect as such or any preceding implementation form of the first aspect, the network entity further comprises a connectivity graph generator being configured to generate a connectivity graph comprising the source node, the plurality of intermediate nodes, and the target node, the connectivity graph indicating communication connections between the source node, the plurality of intermediate nodes, and the target node. Thus, metrics associated to single communication connections between the source node, the plurality of intermediate nodes, and the target node can be determined efficiently.

The connectivity graph can be a directed connectivity graph or an undirected connectivity graph. The source node, the plurality of intermediate nodes, and the target node can be represented as vertices of the connectivity graph. The communication connections between the source node, the plurality of intermediate nodes, and the target node can be represented as edges of the connectivity graph.

In a sixth implementation form of the network entity according to the fifth implementation form of the first aspect, the metric determiner is configured to determine the first metric of the first communication path and/or the second metric of the second communication path upon the basis of the connectivity graph. Thus, the first metric and/or the second metric can be determined efficiently.

The edges of the connectivity graph can indicate metrics between pairs of intermediate nodes. The first metric can e.g. be determined by summarizing the metrics along the first communication path within the connectivity graph. The second metric can e.g. be determined by summarizing the metrics along the second communication path within the connectivity graph.

In a seventh implementation form of the network entity according to the fifth implementation form or the sixth implementation form of the first aspect, the processor is configured to select the intermediate node arranged in the selected communication path upon the basis of the connectivity graph to obtain the selected intermediate node. Thus, the selected intermediate node can be determined efficiently.

The intermediate node can e.g. be selected to be arranged within the selected communication path within the connectivity graph.

In an eighth implementation form of the network entity according to the first aspect as such or any preceding implementation form of the first aspect, the communication network comprises a number of source nodes, wherein the metric determiner is configured to select the source node from the number of source nodes. Thus, a number of source nodes within the communication network can be considered.

The number of source nodes can be determined by the metric determiner upon the basis of a geographic location of the number of source nodes. A number of source nodes can form a cluster of source nodes within the communication network. The number of source nodes can be determined by the metric determiner using a clustering algorithm, e.g. a Kmeans algorithm, based on, for example, their geo distances. The source nodes can then be selected from each determined source node cluster as representatives.

In a ninth implementation form of the network entity according to the first aspect as such or any preceding implementation form of the first aspect, the communication network comprises a number of target nodes, wherein the metric determiner is configured to select the target node from the number of target nodes. Thus, a number of target nodes within the communication network can be considered.

The number of target nodes can be determined by the metric determiner upon the basis of an accessing frequency of the number of target nodes. A number of target nodes can form a cluster of target nodes within the communication network. The number of target nodes can be determined by the metric determiner using a clustering algorithm, e.g. a Kmeans algorithm, based on, for example, their access frequencies. The target nodes can then be selected from each determined target node cluster as representatives.

In a tenth implementation form of the network entity according to the first aspect as such or any preceding implementation form of the first aspect, the source node comprises a base station of the communication network, and/or the target node comprises a host server of the communication network. Thus, the source node and/or the target node can provide communication network functions within a typical mobile communication network.

The base station can be configured to communicate with a user equipment (UE). The host server can be configured to provide an application and/or to provide data to the user equipment (UE).

In an eleventh implementation form of the network entity according to the first aspect as such or any preceding implementation form of the first aspect, the metric determiner is configured to determine a number of metrics between pairs of intermediate nodes, and to determine the first metric of the first communication path and/or the second metric of the second communication path upon the basis of the determined number of metrics. Thus, the first metric and/or the second metric can be determined efficiently.

The number of metrics between the pairs of intermediate nodes can indicate connectivity characteristics between the pairs of intermediate nodes. The number of metrics can comprise a latency metric, a bandwidth metric, or a data rate metric for communications between the pairs of intermediate nodes. The number of metrics can form weights of the edges within the connectivity graph between the pairs of intermediate nodes.

In a twelfth implementation form of the network entity according to the first aspect as such or any preceding implementation form of the first aspect, the first metric of the first communication path and/or the second metric of the second communication path comprises a latency metric, a bandwidth metric, and/or a data rate metric for communications between the source node and the target node. Thus, the first metric and/or the second metric can comprise representative metrics for communications between the source node and the target node.

The latency metric, the bandwidth metric, and/or the data rate metric can indicate a minimum value, a maximum value, or an average value. The average value can be a moving average value. The latency metric, the bandwidth metric, and/or the data rate metric can indicate a statistical moment, e.g. a mean, a variance, a skewness, or a kurtosis.

In a thirteenth implementation form of the network entity according to the first aspect as such or any preceding implementation form of the first aspect, the processor is configured to select the intermediate node to be arranged within a predetermined distance with regard to the source node, wherein the selected intermediate node comprises a virtual machine, and wherein the processor is configured to programmably arrange the virtual machine to provide a mobility management entity function. Thus, the mobility management entity function can be provided close to the source node.

The predetermined distance can be a geodesic distance or a graph distance e.g. within the connectivity graph. The geodesic distance or graph distance can indicate a number of nodes, e.g. 2 or 5, between the selected intermediate node and the source node. The predetermined distance can further be a geographic distance. The geographic distance can indicate a distance, e.g. 20 m or 150 m, between a geographic position of the selected intermediate node and a geographic position of the source node.

The selected intermediate node can be directly connected to the source node. The mobility management entity function can serve communications between the source node and the target node.

In a fourteenth implementation form of the network entity according to the first aspect as such or any preceding implementation form of the first aspect, the processor is configured to select the intermediate node to be arranged within a predetermined distance with regard to the target node, wherein the selected intermediate node comprises a virtual machine, and wherein the processor is configured to programmably arrange the virtual machine to provide a service gateway function and/or a packet gateway function. Thus, the service gateway function and/or the packet gateway function can be provided close to the target node.

The predetermined distance can be a geodesic distance or a graph distance e.g. within the connectivity graph. The geodesic distance or graph distance can indicate a number of nodes, e.g. 3 or 7, between the selected intermediate node and the target node. The predetermined distance can further be a geographic distance. The geographic distance can indicate a distance, e.g. 30 m or 120 m, between a geographic position of the selected intermediate node and a geographic position of the target node.

The selected intermediate node can be directly connected to the target node. The service gateway function and/or the packet gateway function can serve communications between the source node and the target node.

According to a second aspect, the invention relates to a method for programmably arranging an intermediate node for serving communications between a source node and a target node in a communication network comprising a plurality of intermediate nodes arranged in a plurality of communication paths between the source node and the target node, the method comprising determining a first metric of a first communication path from the plurality of communication paths, determining a second metric of a second communication path from the plurality of communication paths, comparing the first metric and the second metric, selecting the communication path which is associated with the lesser metric to obtain a selected communication path for communications between the source node and the target node, selecting an intermediate node arranged in the selected communication path to obtain a selected intermediate node, and programmably arranging the selected intermediate node. Thus, an efficient concept for programmably arranging an intermediate node for serving communications between a source node and a target node in a communication network can be realized.

The method can be performed by the network entity. Further features of the method can directly result from the functionality of the network entity.

In a first implementation form of the method according to the second aspect as such, the method comprises determining the first communication path and the second communication path from the plurality of communication paths. Thus, different communication paths can be considered for selecting the intermediate node.

In a second implementation form of the method according to the second aspect as such or the first implementation form of the second aspect, the selected intermediate node comprises a virtual machine, wherein the method comprises programmably arranging the virtual machine to provide a communication network function, in particular a mobility management entity function, a service gateway function, and/or a packet gateway function. Thus, the communication network function can be provided efficiently.

In a third implementation form of the method according to the second aspect as such or any preceding implementation form of the second aspect, the method comprises selecting a further intermediate node arranged in the selected communication path to obtain a further selected intermediate node, and programmably arranging the further selected intermediate node. Thus, different intermediate nodes can be programmably arranged within the selected communication path.

In a fourth implementation form of the method according to the third implementation form of the second aspect, the further selected intermediate node comprises a further virtual machine, wherein the method comprises programmably arranging the further virtual machine to provide a further communication network function, in particular a mobility management entity function, a service gateway function, and/or a packet gateway function. Thus, the further communication network function can be provided efficiently.

In a fifth implementation form of the method according to the second aspect as such or any preceding implementation form of the second aspect, the method comprises generating a connectivity graph comprising the source node, the plurality of intermediate nodes, and the target node, the connectivity graph indicating communication connections between the source node, the plurality of intermediate nodes, and the target node. Thus, metrics associated to single communication connections between the source node, the plurality of intermediate nodes, and the target node can be determined efficiently.

In a sixth implementation form of the method according to the fifth implementation form of the second aspect, the method comprises determining the first metric of the first communication path and/or the second metric of the second communication path upon the basis of the connectivity graph. Thus, the first metric and/or the second metric can be determined efficiently.

In a seventh implementation form of the method according to the fifth implementation form or the sixth implementation form of the second aspect, the method comprises selecting the intermediate node arranged in the selected communication path upon the basis of the connectivity graph to obtain the selected intermediate node. Thus, the selected intermediate node can be determined efficiently.

In an eighth implementation form of the method according to the second aspect as such or any preceding implementation form of the second aspect, the communication network comprises a number of source nodes, wherein the method comprises selecting the source node from the number of source nodes. Thus, a number of source nodes within the communication network can be considered.

In a ninth implementation form of the method according to the second aspect as such or any preceding implementation form of the second aspect, the communication network comprises a number of target nodes, wherein the method comprises selecting the target node from the number of target nodes. Thus, a number of target nodes within the communication network can be considered.

In a tenth implementation form of the method according to the second aspect as such or any preceding implementation form of the second aspect, the source node comprises a base station of the communication network, and/or the target node comprises a host server of the communication network. Thus, the source node and/or the target node can provide communication network functions within a typical mobile communication network.

In an eleventh implementation form of the method according to the second aspect as such or any preceding implementation form of the second aspect, the method comprises determining a number of metrics between pairs of intermediate nodes, and determining the first metric of the first communication path and/or the second metric of the second communication path upon the basis of the determined number of metrics. Thus, the first metric and/or the second metric can be determined efficiently.

In a twelfth implementation form of the method according to the second aspect as such or any preceding implementation form of the second aspect, the first metric of the first communication path and/or the second metric of the second communication path comprises a latency metric, a bandwidth metric, and/or a data rate metric for communications between the source node and the target node. Thus, the first metric and/or the second metric can comprise representative metrics for communications between the source node and the target node.

In a thirteenth implementation form of the method according to the second aspect as such or any preceding implementation form of the second aspect, the method comprises selecting the intermediate node to be arranged within a predetermined distance with regard to the source node, wherein the selected intermediate node comprises a virtual machine, and wherein the method comprises programmably arranging the virtual machine to provide a mobility management entity function. Thus, the mobility management entity function can be provided close to the source node.

In a fourteenth implementation form of the method according to the second aspect as such or any preceding implementation form of the second aspect, the method comprises selecting the intermediate node to be arranged within a predetermined distance with regard to the target node, wherein the selected intermediate node comprises a virtual machine, and wherein the method comprises programmably arranging the virtual machine to provide a service gateway function and/or a packet gateway function. Thus, the service gateway function and/or the packet gateway function can be provided close to the target node.

According to a third aspect, the invention relates to a computer program comprising a program code for performing the method when executed on a computer. Thus, the method can be performed in an automatic and repeatable manner.

The network entity can be programmably arranged to perform the computer program.

The invention can be implemented in hardware and/or software.

Although the invention is described with reference to specific features, implementation forms, and embodiments, it is evident that various modifications and combinations can be made thereto without departing from the spirit and scope of the invention. The description and the figures are, accordingly, to be regarded simply as an illustration of the invention as defined by the appended claims, and are contemplated to cover any and all modifications, variations, combinations, or equivalents that fall within the scope of the invention.

BRIEF DESCRIPTION OF THE DRAWINGS

Embodiments of the invention will be described with respect to the following figures, in which.

DETAILED DESCRIPTION

Figure 1:
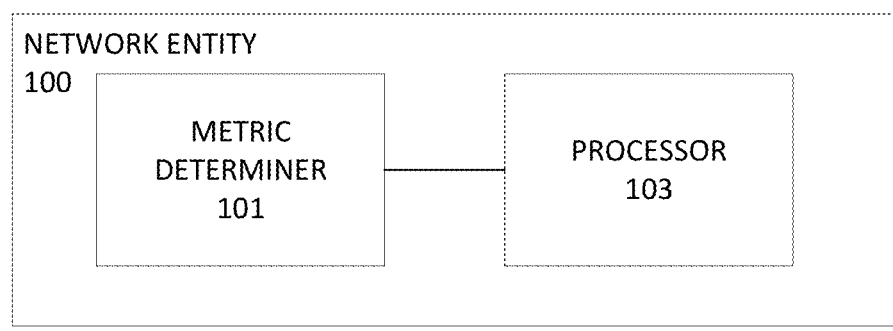
FIG. 1 shows a diagram of a network entity for programmably arranging an intermediate node for serving communications between a source node and a target node in a communication network according to an embodiment.

FIG. 1 shows a diagram of a network entity 100 for programmably arranging an intermediate node for serving communications between a source node and a target node in a communication network according to an embodiment. The communication network comprises a plurality of intermediate nodes arranged in a plurality of communication paths between the source node and the target node.

The network entity 100 comprises a metric determiner 101 for determining a first metric of a first communication path from the plurality of communication paths, and for determining a second metric of a second communication path from the plurality of communication paths, the metric determiner 101 being further configured to compare the first metric and the second metric and to select the communication path which is associated with the lesser metric to obtain a selected communication path for communications between the source node and the target node, and a processor 103 being configured to select an intermediate node arranged in the selected communication path to obtain a selected intermediate node, and to programmably arrange the selected intermediate node.

In a further embodiment, the network entity 100 further comprises a connectivity graph generator being configured to generate a connectivity graph comprising the source node, the plurality of intermediate nodes, and the target node, the connectivity graph indicating communication connections between the source node, the plurality of intermediate nodes, and the target node.

Figure 2:
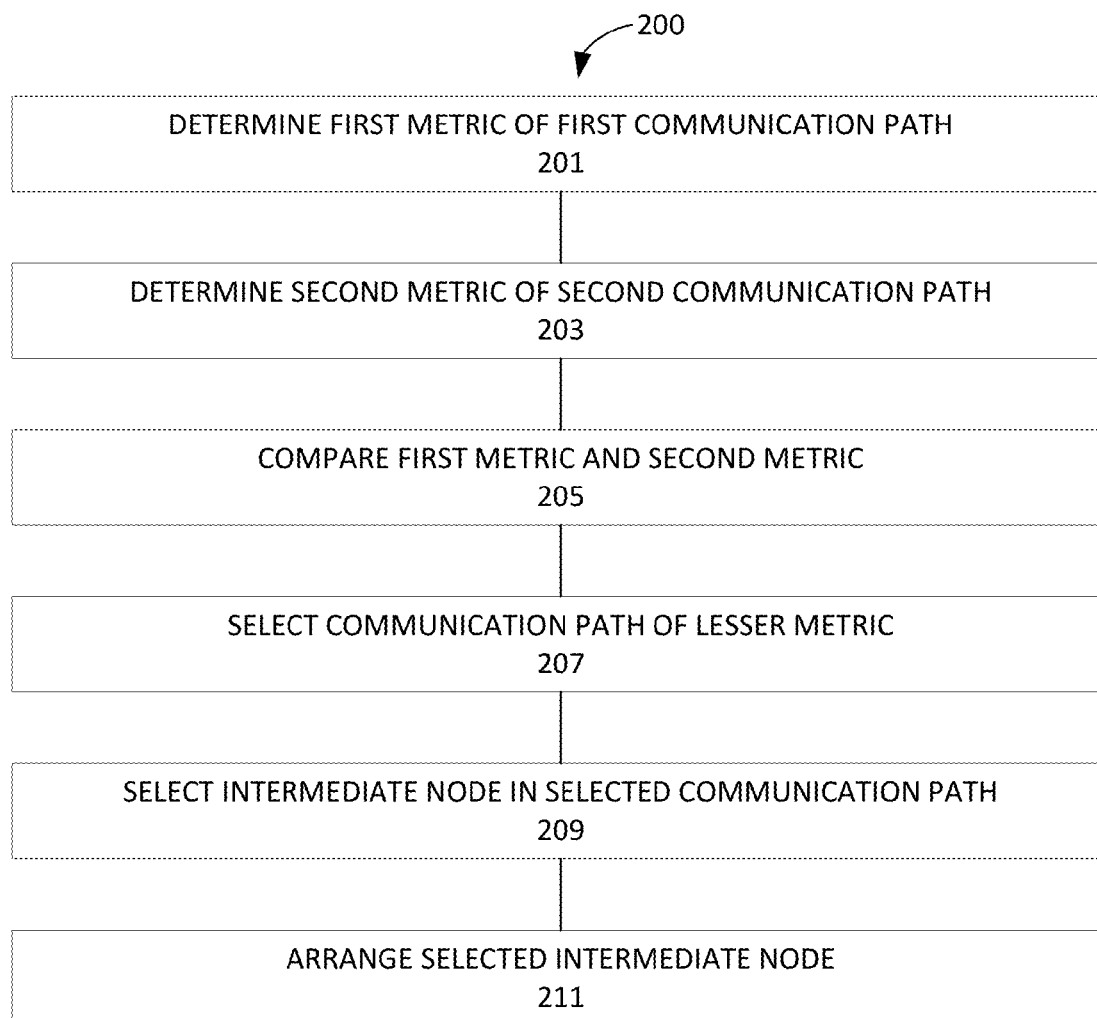
FIG. 2 shows a diagram of a method for programmably arranging an intermediate node for serving communications between a source node and a target node in a communication network according to an embodiment.

FIG. 2 shows a diagram of a method 200 for programmably arranging an intermediate node for serving communications between a source node and a target node in a communication network according to an embodiment. The communication network comprises a plurality of intermediate nodes arranged in a plurality of communication paths between the source node and the target node.

The method 200 comprises determining 201 a first metric of a first communication path from the plurality of communication paths, determining 203 a second metric of a second communication path from the plurality of communication paths, comparing 205 the first metric and the second metric, selecting 207 the communication path which is associated with the lesser metric to obtain a selected communication path for communications between the source node and the target node, selecting 209 an intermediate node arranged in the selected communication path to obtain a selected intermediate node, and programmably arranging 211 the selected intermediate node.

In a further embodiment, the method 200 further comprises generating a connectivity graph comprising the source node, the plurality of intermediate nodes, and the target node, the connectivity graph indicating communication connections between the source node, the plurality of intermediate nodes, and the target node.

Figure 3:
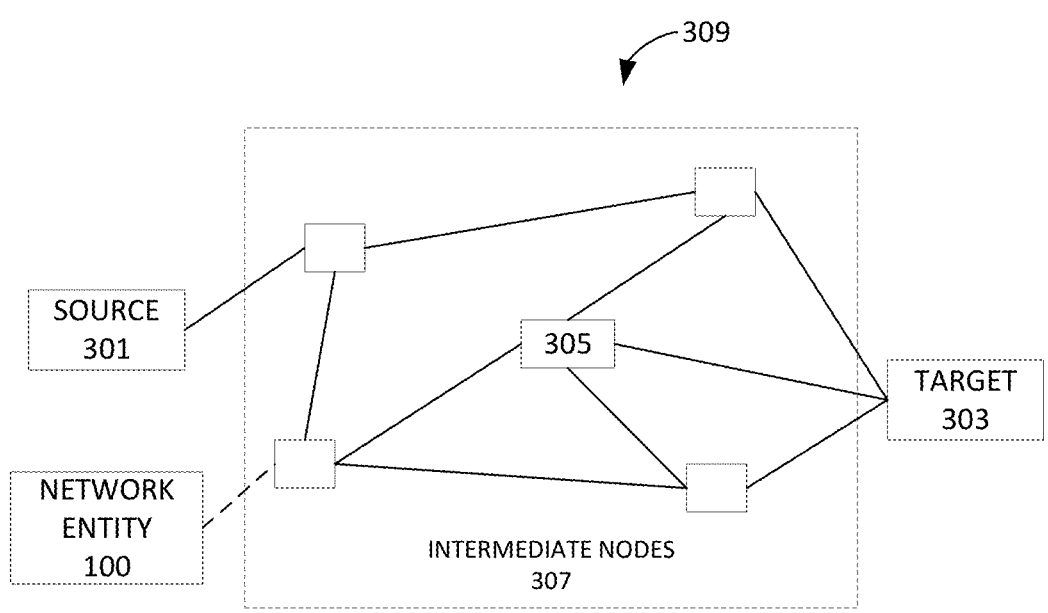
FIG. 3 shows a diagram of a communication network comprising a network entity for programmably arranging an intermediate node within a plurality of intermediate nodes for serving communications between a source node and a target node according to an embodiment.

FIG. 3 shows a diagram of a communication network 309 comprising a network entity 100 for programmably arranging an intermediate node 305 within a plurality of intermediate nodes 307 for serving communications between a source node 301 and a target node 303 according to an embodiment. The network entity 100 forms a possible implementation of the network entity 100 as described in conjunction with FIG. 1.

The source node 301 can comprise a base station of the communication network 309. The target node 303 can comprise a host server of the communication network 309. The intermediate node 305 can comprise a virtual machine, or a part of a virtual machine, or multiple virtual machines, being configured to provide a communication network function, in particular a mobility management entity function, a service gateway function, or a packet gateway function.

The network entity 100 can be a dedicated stand-alone network entity within the communication network 309. The network entity 100 can further comprise the source node 301, the target node 303, and/or an intermediate node of the plurality of intermediate nodes 307. The network entity 100 can comprise an operations support system (OSS) of the communication network 309.

Figure 4:
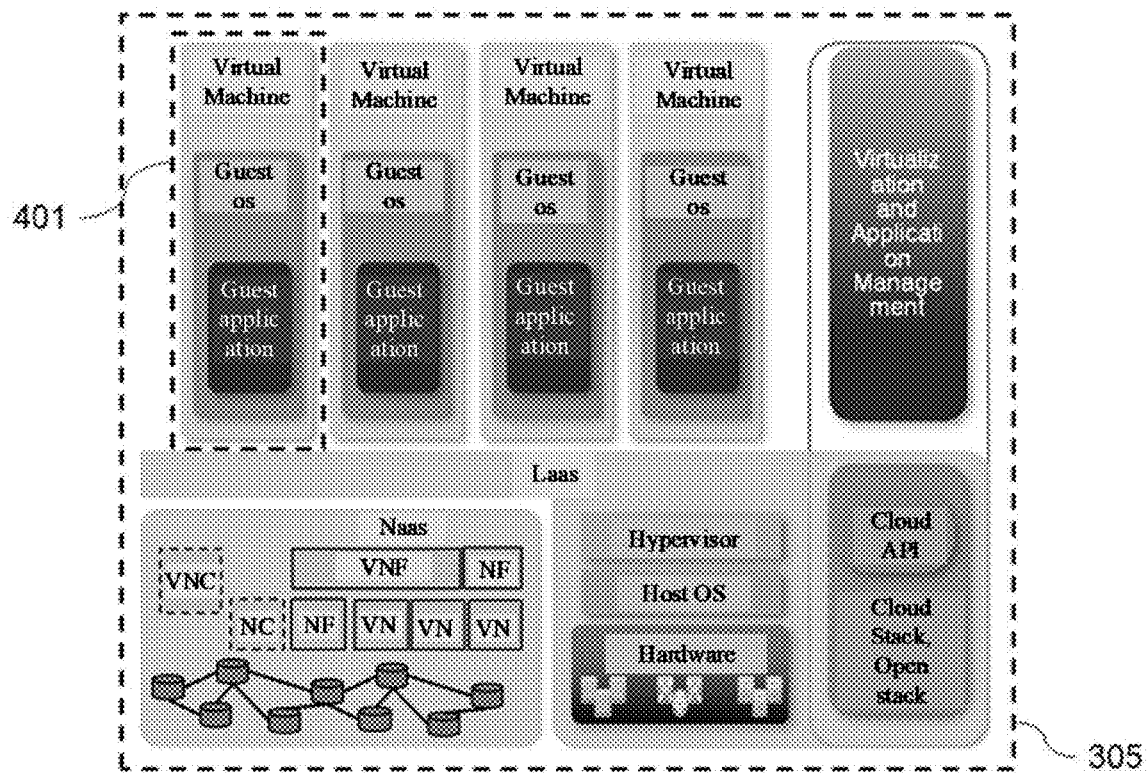
FIG. 4 shows a diagram of an intermediate node comprising a virtual machine to provide a communication network function according to an embodiment.

FIG. 4 shows a diagram of an intermediate node 305 comprising a virtual machine 401 to provide a communication network function according to an embodiment. The intermediate node 305 forms a possible implementation of the intermediate node 305 as described in conjunction with FIG. 3.

The virtual machine 401 can execute a guest operating system (OS). The guest operating system (OS) can execute a guest application. The intermediate node 305 can comprise a number of virtual machines, e.g. the virtual machine 401 and three further virtual machines. The virtual machine 401 can be selected from the number of virtual machines within the intermediate node 305. Therefore, the communication network function can be provided.

The intermediate node 305 can perform a virtualization and application management. The intermediate node 305 can provide a network as a service (NaaS) functionality upon the basis of virtualized communication network functions (VNF). The intermediate node 305 can be realized as part of an infrastructure as a service (IaaS) approach using a hypervisor, a host operating system (OS), and hardware modules. Furthermore, a cloud stack, an open stack, and a cloud application programming interface (API) can be employed.

Network function virtualization (NFV) can relate to a communication network architecture that can be based on technologies related to information technology (IT) virtualization in order to virtualize entire classes of communication network functions into building blocks that may be connected, or chained, together to provide the communication network function.

Network function virtualization (NFV) can rely upon, but may differ from, traditional server virtualization techniques such as those used in enterprise information technology (IT). A virtualized communication network function (VNF) may be realized using one or more virtual machines e.g. executing different software and processes, on top of network nodes being realized as industry standard high volume servers, switches, storages, or being part of a cloud computing infrastructure, instead of employing custom hardware appliances for each communication network function.

Figure 5:
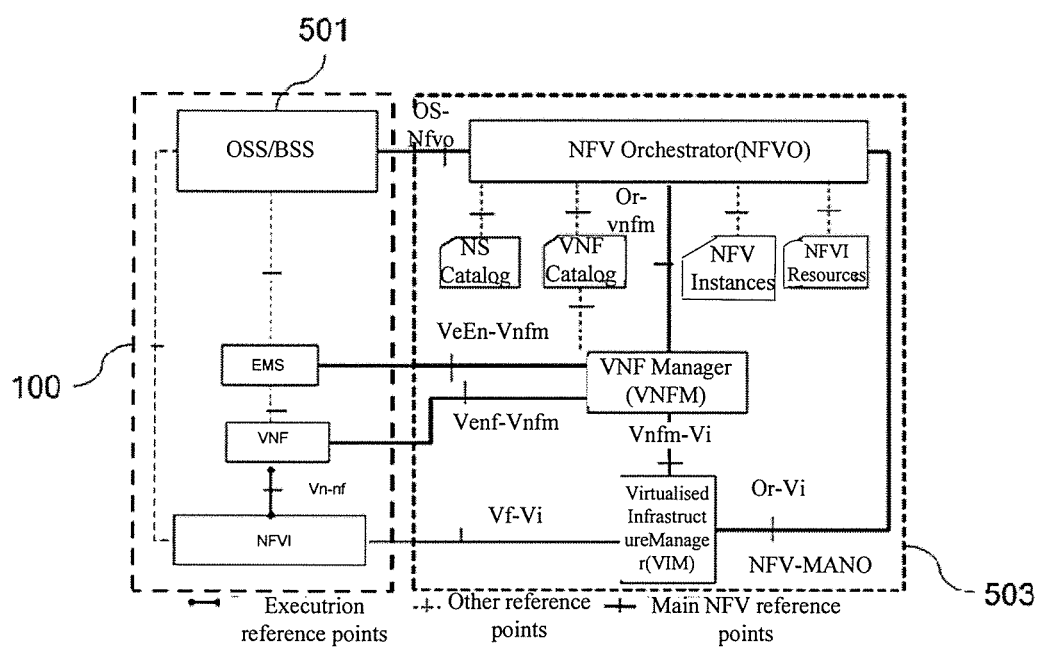
FIG. 5 shows a diagram of a network entity comprising an operations support system (OSS) of a communication network according to an embodiment.

FIG. 5 shows a diagram of a network entity 100 comprising an operations support system (OSS) 501 of a communication network according to an embodiment. The diagram further shows a management and orchestration (MANO) system 503. The diagram illustrates a communication network function virtualization (NFV) management and orchestration (MANO) architecture. The network entity 100 forms a possible implementation of the network entity 100 as described in conjunction with FIG. 1.

A part of providing a communication network function virtualization (NFV) environment can be performed by automation and orchestration. There can be a separate management and orchestration (MANO) system 503 for supporting the communication network function virtualization (NFV) indicating how flexibility within the communication network can be controlled.

Embodiments can apply and/or extend the concepts of management and orchestration (MANO) in order to provide virtualization of a communication network function.

Figure 6:
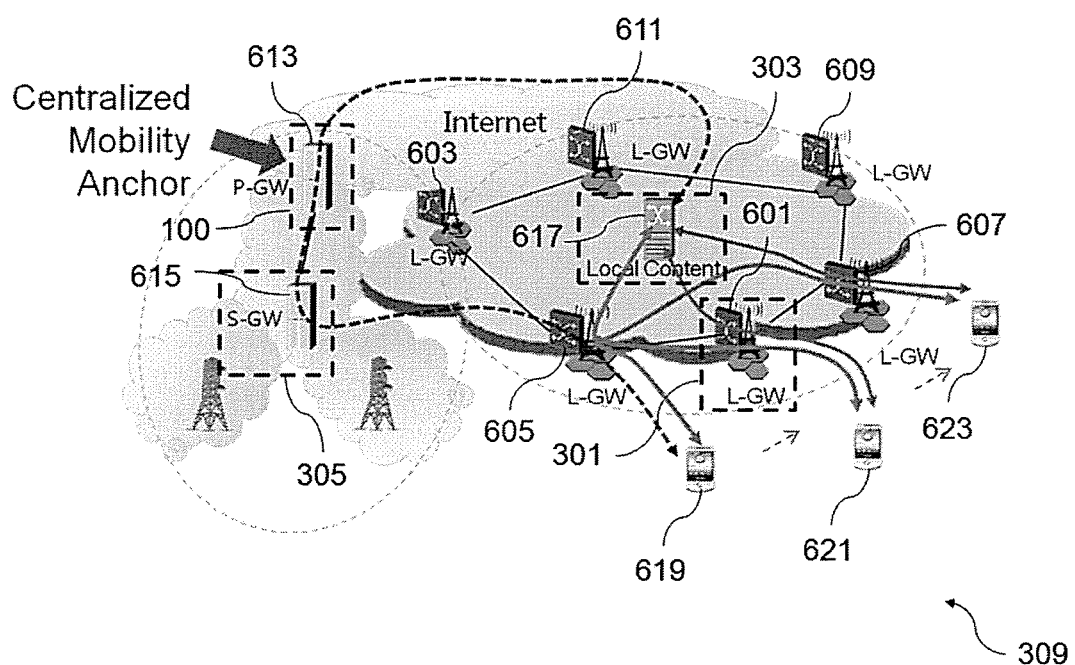
FIG. 6 shows a diagram of a communication network comprising a network entity for programmably arranging an intermediate node within a plurality of intermediate nodes for serving communications between a source node and a target node according to an embodiment.

FIG. 6 shows a diagram of a communication network 309 comprising a network entity 100 for programmably arranging an intermediate node 305 within a plurality of intermediate nodes for serving communications between a source node 301 and a target node 303 according to an embodiment. The network entity 100 forms a possible implementation of the network entity 100 described in conjunction with FIG. 1. The intermediate node 305 forms a possible implementation of the intermediate node 305 described in conjunction with FIG. 3 and FIG. 4.

The communication network 309 comprises a plurality of local gateways 601-611, a packet gateway 613, a service gateway 615, a local content host server 617, and a plurality of user equipments 619-623.

The network entity 100 can e.g. comprise the packet gateway 613. The source node 301 can e.g. comprise the local gateway 601. The target node 303 can e.g. comprise the local content host server 617. The intermediate node 305 can e.g. comprise the service gateway 615. The plurality of intermediate nodes 307 described in conjunction with FIG. 3 can e.g. comprise the plurality of local gateways 603, 605, 607, 609, 611, and the service gateway 615.

Placement algorithms for communication network functions can refer to optimization instructions or algorithms that the network entity 100, e.g. using a communication network management function, can execute in determining a location, e.g. a topological location and/or a geographical location, of a particular node within the communication network 309 in order to fulfill or to improve functional specifications, such as communication network signaling and/or control functions, and non-functional specifications, such as signaling latency.

Mobile communication network infrastructures, such as 2nd generation (2G), $3^{rd}$ generation (3G) and $4^{th}$ generation (4G) or long term evolution (LTE) communication networks may not support a dynamic or flexible placement of communication network functions or elements. Communication network functions may be executed by dedicated hardware appliances and may not be deployed in a flexible way. In addition, mobility and session control functions, e.g. mobility management entities (MMEs), service gateways (sGWs), and/or packet gateways (pGWs), may be deployed centrally. There may be very few mobility anchors, as compared to radio access nodes, and traffic of millions of mobile user equipments in the operational communication network may be managed by the same mobility anchor.

The challenge of placement in these communication networks may be simple, wherein core communication network functions may be grouped into a pool and may be centralized. However, such centralized approach may have constraints with regard to next generation communication networks and services.

Next generation communication networks can be featured with ultra-high capacity in order to support a massive number of user equipments and communication connections, e.g. 50 billion connections, and an ultra-low communication latency in both signaling plane, control plane and data plane. Centralized anchors for mobility and gateway communication network functions may be non-optimal for flat communication network architectures featured in 4$^{th}$ generation (4G) and/or 5$^{th}$ generation (5G) communication networks.

With regard to routing and communication network performance, an Internet protocol (IP) communication path via a centralized anchor, e.g. a gateway node, may take longer, so that mobility and session protocol deployments, that lack optimization extensions, may result in non-optimal communication paths, affecting communication network performance.

Content servers, e.g. the local content host server 617, and cache servers, e.g. the local gateway 605, may get deployed at an edge of the communication network 309 which may be advantageous for fixed communication network providers and users. A centralized mobility anchor in the mobile communication network may not be desirable for accessing within the localized content host server scenario. Mobility anchors may be distributed along with the local gateways 601-611. In addition, a centralized anchor may lead to an increased end-to-end communication latency between user equipments 619-623, e.g. mobile terminals, and the local content host server 617, e.g. application server, and can degrade the overall communication network performance.

With regard to scalability, a centralized communication path maintenance and context maintenance for a large number of user equipments 619-623, e.g. mobile hosts, can be challenging to scale. Centralization may introduce an excessive traffic overhead and resource consumptions for both control plane and data plane, since all traffic may have to go through multiple central anchors.

With regard to a single point of failure, a centralized approach may be more exposed. A distributed approach may mitigate the exposure to the communication network 309.

In order to solve these issues, mobile communication network functions, i.e. mobile anchors, can be deployed in a distributed manner. For example, a mobility management entity (MME) can be deployed along with the local gateways 601-611 for an improved mobility management. Virtualization of communication network functions can facilitate and enable such distributed deployment by separating communication network functions from hardware and therefore relaxing the intrinsic dependency. Combining the specifications from the infrastructural evolution of the communication network 309 and the enablement support from communication network function virtualization (NFV), a placement of virtualized communication network functions becomes feasible.

In an operational communication network 309, it may be challenging to convert the challenge of placement of virtualized communication network functions into a mathematical representation, due to the communication network domain knowledge involved into the desired placement. The placement of a communication network function can be described as a multiple-objective optimization problem. A multi-objective optimization problem can be defined as an optimization problem that involves multiple objective functions. In mathematical terms, the multi-objective optimization problem can be formulated according to:

$$\min(f_1(x), f_2(x), \ldots, f_k(x))$$

$$s.t.\ x \in X,$$

The term multiple-objective can mean that the placement may be performed at the communication network level, instead of the level of a single node or communication network function. The algorithm can take into consideration varied types of nodes, including, but not limited to, mobility management entities (MMEs), service gateways (sGWs) and packet gateways (pGWs). The placement can consider both control-plane performance, e.g. signaling between base stations, mobility management entities (MMEs), service gateways (sGWs), and packet gateways (pGWs), and data-plane characteristics, e.g. data forwarding communication paths between base stations and packet gateways.

Multiple optimization objectives may be considered, including performance enhancements, in particular with regard to latency, a signaling overhead reduction, a failure recovery latency, and/or resource usage optimization. The challenge may be an NP-hard (non-deterministic polynomial-time hard) challenge. Another challenge can result from the nature of communications in mobile wireless communication networks with regard to a sequential communication pattern between multiple nodes in signaling.

In the following, two signaling procedures, a communication network triggered service request and a communication network triggered service attach, are described.

In the attach procedure, a user equipment (UE) can send an attach request first to a node, e.g. an evolved node B (eNodeB). The request can then be forwarded to new and/or old mobility management entities (MMEs). The mobility management entities (MMEs) can communicate to a home subscriber server (HSS) if desired for authentication purpose, and a service gateway. The service gateway can then communicate to a packet data network (PDN) gateway. Responses can then be sent back in sequences to previous nodes, e.g. the packet data network (PDN) gateway towards the service gateway, the service gateway to the mobility management entity (MME), the mobility management entity (MME) to the base station, e.g. the evolved node B (eNodeB), and the base station to the user equipment (UE). This can be an example of a sequential communication pattern.

In order to optimize the signaling performance, e.g. with regard to latency, it may be desirable to optimize the end-to-end latency, instead of the latency between two separate nodes. That is, optimization may be performed for such sequential communication patterns.

Specific placement approaches can operate at a virtual machine (VM) level and can be designed for data centers. The placement of a virtual machine (VM) can be defined as a process of selecting a most suitable node for the virtual machine (VM). In particular, the goal of placement may either be resource maximization on individual nodes, or load balancing among nodes. The nodes can be considered as hosts for the virtual machine (VM).

The differences between placement of virtual machines (VMs) and placement of communication network functions can be summarized as follows. The placement of communication network functions can focus upon performance optimization of communication network functions and applications, e.g. with regard to signaling. The placement of a virtual machine can focus upon resource maximization, without considerations of virtualized communication network functions executed inside.

Specific placement approaches may investigate how to optimally place virtual machines (VMs), or how to optimize node performance in the communication network, but not both. Optimizing in one dimension may, however, be restrictive.

In particular, algorithms for the placement of virtual machines (VMs) can share the following constraints. Algorithms for the placement of virtual machines (VMs) may only consider resource constraints on the virtual machine (VM) level without considerations on application level performance optimizations. Approaches for the placement of virtual machines (VMs) may not be capable of optimizing sequential communication patterns. Furthermore, a suboptimal placement of virtual machines (VMs) may introduce traffic overhead.

Embodiments are based on a long term evolution (LTE) and/or system architecture evolution (SAE) communication network, e.g. providing mobility management entity (MME) function or gateway functions. The approach can also be applied to further communication network functions and to further operational communication networks, without or with minor modifications.

Figure 7:
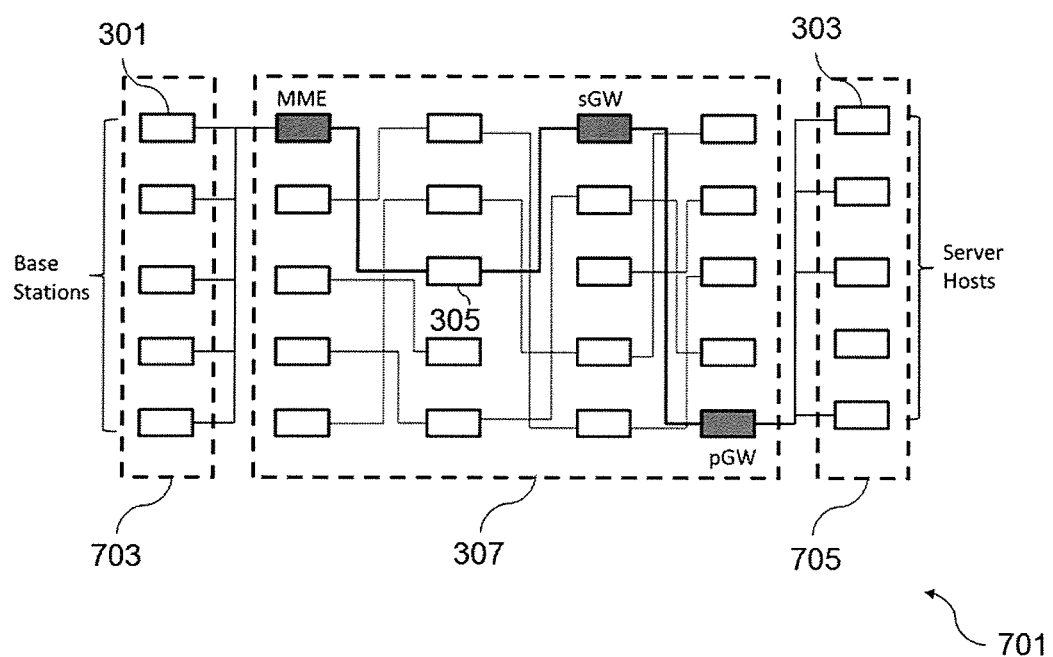
FIG. 7 shows a diagram of a connectivity graph indicating communication connections between a source node, a plurality of intermediate nodes, and a target node according to an embodiment.

FIG. 7 shows a diagram of a connectivity graph 701 indicating communication connections between a source node 301, a plurality of intermediate nodes 307, and a target node 303 according to an embodiment.

The connectivity graph 701 comprises a number of source nodes 703 comprising the source node 301. The connectivity graph 701 further comprises a number of target nodes 705 comprising the target node 303. The connectivity graph 701 further comprises the plurality of intermediate nodes 307 comprising the intermediate node 305. The intermediate node 305 forms a possible implementation of the intermediate node 305 as described in conjunction with FIG. 3 and FIG. 4.

An intermediate node of the plurality of intermediate nodes 307 can provide a mobility management entity (MME) function, a service gateway (sGW) function, and/or a packet gateway (pGW) function. The number of source nodes 703 can be a number of base stations. The number of target nodes 705 can be a number of host servers or server hosts.

Embodiments relate to the placement of communication network functions within communication networks and services, such as wireless or mobile communication networks and systems. The approach can be applied to any wireless access and/or core communication network, e.g. the communication network 309 as described in conjunction with FIG. 3, e.g. conforming to $3^{rd}$ generation partnership project (3GPP) specifications or standards, e.g. including $2^{nd}$ generation (2G), $3^{rd}$ generation (3G), $4^{th}$ generation (4G), and $5^{th}$ generation (5G) communication networks. In addition, the approach may also be applied to non-3GPP Internet protocol (IP) access communication networks, such as Wi-Fi and WiMAX (Worldwide Interoperability for Microwave Access) communication networks.

The approach may also be used in the placement of any virtualized communication network function onto distributed virtualized resources, and may not be limited to virtualized communication network functions. The challenge of placement of heterogeneous communication network functions in distributed virtualization environments in order to reduce latency in both a control plane and a data plane within a communication network and to maximize a communication network performance can be addressed.

The connectivity graph 701 can be generated. The connectivity graph 701 can comprise the number of source nodes 703, e.g. representing selected cells within the communication network, the plurality of intermediate nodes 307, e.g. representing candidate virtual machines (VMs), and the number of target nodes 705, e.g. representing selected application servers. The number of source nodes 703, the plurality of intermediate nodes 307, and the number of target nodes 705 can be represented as vertices of the connectivity graph 701. Pairs of metrics, e.g. connectivity characteristics, can be represented as edges of the connectivity graph 701.

Based on the connectivity graph 701, a first communication path and a second communication path, e.g. forming a group of communication paths, can be determined. Along a communication path, an intermediate node, e.g. the intermediate node 305, can be identified as a placement candidate of a particular communication network function, e.g. based on latency specifications. A final placement can further be determined based on further factors, such as a resource availability and a failure recovery latency. Consequently, the intermediate node 305 can be programmably arranged to provide a communication network function. This algorithm can be denotes as progressive virtualized communication network function (VNF) placement algorithm.

Embodiments can relate to a network entity and a method for placement of a virtualized communication network function within an operational communication network, e.g. a mobile wireless communication network.

Metrics, e.g. connectivity characteristics, between the plurality of intermediate nodes 307, e.g. comprising candidate virtual machines (VMs) for placement of a communication network function, can be determined or measured.

The connectivity graph 701 can be generated by determining the number of source nodes 703, e.g. a number of radio base stations, the number of target nodes 705, e.g. a number of host servers or server hosts, and the plurality of intermediate nodes 307, e.g. comprising candidate virtual machines (VMs) for placement of the communication network function, within the communication network, and determining or measuring metrics, e.g. connectivity characteristics, as a weight of each edge within the connectivity graph 701.

A first communication path and a second communication path, e.g. multiple communication paths, between the source node 301, e.g. representing a cell, and the target node 303, e.g. representing a host server or server host, can be determined or calculated.

Optionally, an intermediate node, e.g. comprising a virtual machine (VM), that is closest to the target node 303, e.g. a host server or server host, can be selected to provide a gateway function, i.e. representing a placement candidate for a gateway. This can relate to an intermediate node, e.g. comprising a virtual machine (VM), at the end of each determined communication path.

Optionally, an intermediate node, e.g. comprising a virtual machine (VM), that is closest to the source node 301, e.g. a base station, can be selected to provide a mobility management entity (MME) function, i.e. representing a placement candidate for a mobility management entity (MME). This can relate to an intermediate node, e.g. comprising a virtual machine (VM), at the beginning of each determined communication path.

The intermediate node, e.g. the intermediate node 305, can be determined to be programmably arranged, e.g. with regard to a final placement of the communication network function, by selecting the intermediate node, e.g. comprising a virtual machine (VM), providing e.g. the most virtualized resources for the communication network function to be placed, and/or having the smallest failure recovery latency for each communication network function to be placed.

The placement algorithm can follow a progressive placement concept. In communication networks, e.g. in mobile wireless communication networks, nodes can be interconnected and can collaborate with each other in fulfilling each communication network function. When comes to deploying an entire communication network and/or a plurality of nodes of different types, it may not be feasible to determine the location of each node and/or communication network function separately.

The approach can firstly select intermediate nodes, e.g. comprising candidate virtual machines (VMs), within or along a first communication path and a second communication path, e.g. forming a group of shortest communication paths, between the number of source nodes 703 and the number of target nodes 705. From the intermediate nodes, e.g. comprising candidate virtual machines (VMs), a placement of each different node type or communication network function can then progressively be determined, e.g. according to functional and/or non-functional specifications of each node type or communication network function, in particular with regard to communication patterns between the nodes defined by 3GPP procedures.

The approach is described with regard to $4^{th}$ generation (4G) communication networks. The technologies may, however, be applicable to any wireless access and/or core communication network, including $2^{nd}$ generation (2G), $3^{rd}$ generation (3G), $4^{th}$ generation (4G) and next-generation wireless access and/or core communication networks.

Figure 8:
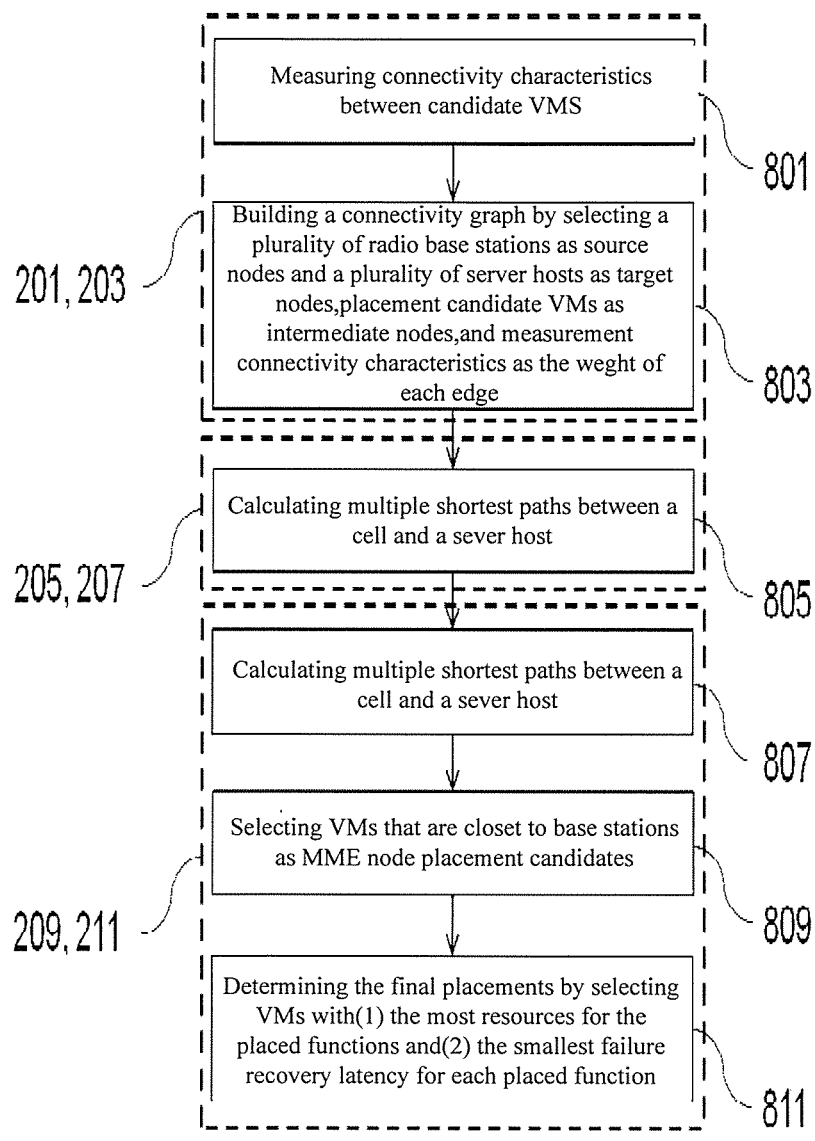
FIG. 8 shows a diagram of a method for programmably arranging an intermediate node for serving communications between a source node and a target node in a communication network according to an embodiment.

FIG. 8 shows a diagram of a method 200 for programmably arranging an intermediate node for serving communications between a source node and a target node in a communication network according to an embodiment. The method 200 forms a possible implementation of the method 200 as described in conjunction with FIG. 2.

The method 200 comprises a step 801 of determining, e.g. measuring, metrics, e.g. connectivity characteristics, between the plurality of intermediate nodes, e.g. comprising candidate virtual machines (VMs).

The method 200 further comprises a step 803 of generating, e.g. building, a connectivity graph by selecting a number of source nodes, e.g. a number of radio base stations, a number of target nodes, e.g. a number of server hosts or host servers, a plurality of intermediate nodes, e.g. comprising candidate virtual machines (VMs), and metrics, e.g. connectivity characteristics, as a weight of each edge.

The method 200 further comprises a step 805 of determining or calculating a first communication path and a second communication path, e.g. multiple shortest communication paths, between a source node, e.g. a cell, and a target node, e.g. a server host or host server.

The method 200 further comprises a step 807 of selecting an intermediate node, e.g. comprising a virtual machine (VM), that is closest to a target node, e.g. server host or host server, to provide a gateway function as a gateway node placement candidate.

The method 200 further comprises a step 809 of selecting an intermediate node, e.g. comprising a virtual machine (VM), that is closest to a source node, e.g. a base station, to provide a mobility management entity (MME) function as a mobility management entity (MME) node placement candidate.

The method 200 further comprises a step 811 of determining the intermediate node to be programmably arranged, e.g. with regard to a final placement of the communication network function, by selecting the intermediate node, e.g. comprising a virtual machine (VM), providing e.g. the most virtualized resources for the communication network function to be placed, and/or having the smallest failure recovery latency for each communication network function to be placed.

Determining 201 a first metric of a first communication path from the plurality of communication paths, and determining 203 a second metric of a second communication path from the plurality of communication paths, as described in conjunction with FIG. 2, can comprise the step 801 and the step 803.

Comparing 205 the first metric and the second metric, and selecting 207 the communication path which is associated with the lesser metric to obtain a selected communication path for communications between the source node and the target node, as described in conjunction with FIG. 2, can comprise the step 805.

Selecting 209 an intermediate node arranged in the selected communication path to obtain a selected intermediate node, and programmably arranging 211 the selected intermediate node, as described in conjunction with FIG. 2, can comprise the step 807, the step 809, and the step 811.

Programmably arranging the selected intermediate node can be performed by the network entity 100, as described in conjunction with FIG. 1, wherein the network entity 100 can comprise an operations support system (OSS) of the communication network.

Embodiments can be related to virtualized network nodes, e.g. wireless access nodes such as base stations, and core network nodes such as serving GPRS support nodes (SGSNs), mobility management entities (MMEs), service gateways (sGWs), packet gateways (pGWs), and operation support systems (OSSs). The placement of the communication network function can be managed by an operations support system (OSS). In the following, the implementation is described in more detail.

In step 801, metrics, e.g. connectivity characteristics, between the plurality of intermediate nodes, e.g. comprising candidate virtual machines (VMs) can be determined or measured. The metrics, e.g. connectivity characteristics, may comprise a latency between the plurality of intermediate nodes, e.g. comprising virtual machines (VMs), or an available bandwidth between the plurality of intermediate nodes, e.g. comprising virtual machines (VMs). Each metric may be determined or measured statistically, for example, with regard to a maximum value, a minimum value, and average value, e.g. an arithmetic average value or a moving average value, or any further statistic.

By default, the metric to be measured can be an average latency, since the end-to-end latency may be a major concern. However, any further performance related metric can be used in the placement algorithm.

In step 803, a connectivity graph based on a distribution or location of the plurality of intermediate nodes, e.g. comprising virtual machines (VMs), and the determined metrics, e.g. connectivity characteristics, can be generated or constructed. The connectivity graph can form a possible implementation of the connectivity graph 701 described in conjunction with FIG. 7.

An operational communication network, e.g. the communication network 309 as described in conjunction with FIG. 3, can serve millions of user equipments (UEs), and can comprise potentially hundreds of thousands of nodes or cells including macro cells, pico cells, and small cells, communicating with millions of nodes, e.g. application servers. Selecting all source nodes, e.g. base stations, in the determination process may incur a significant amount of computation overhead in the next step. A full connectivity graph built upon all source nodes may be complex to analyze.

Therefore, selection algorithms can be applied, e.g. performing a selection of representative source nodes, e.g. base stations, of the connectivity graph, and representative target nodes, e.g. server hosts or host servers, of the connectivity graph. The connectivity graph can then be generated based on the selection results. The selection of the source nodes can be performed in order to select representative source nodes, e.g. base stations, as a starting point of a communication path determination in the next step.

The source nodes, e.g. access nodes, can be selected based on their geographic locations and/or their service consumption patterns, such as urban vs. rural patterns, work area vs. residential area patterns. The source nodes can form the number of source nodes 703 as described in conjunction with FIG. 7. In particular, clustering algorithms, e.g. a Kmeans algorithm, can be used to group source nodes, e.g. base stations, based on their loads and service consumption patterns. The source nodes, e.g. base stations, can then be selected or picked from each cluster as representative source nodes.

The selection of the target nodes can be performed in order to select representative target nodes, e.g. server hosts or host servers, based on different factors, such as a service they may provide, e.g. a video service, a messaging service, a browsing service, or a gaming service, and/or access frequencies, e.g. the top most frequently accessed target nodes.

A selection simply based on access frequencies may, however, lead to biased results. For example, target nodes, e.g. host servers or server hosts, of major service providers may be selected while smaller service providers may be ignored in the placement optimization. In an embodiment these factors are taken into consideration, and a clustering algorithm, e.g. a Kmeans algorithm, is used to cluster target nodes based on the types of services and access frequencies. Then, selection can be performed by selecting or picking target nodes from each cluster of target nodes. The target nodes can form the number of target nodes 705 as described in conjunction with FIG. 7.

Virtual machines (VMs) may already be placed in the distributed manner across the communication network, with virtualized resources being partitioned and pre-defined. The virtual machines can be comprised by the plurality of intermediate nodes 307 as described in conjunction with FIG. 3. The goal of the approach can be to place virtualized communication network functions onto these virtual machines (VMs). Multiple communication network functions may be placed onto the same virtual machine (VM), e.g. if leading to an improved performance.

Based on the selected number of source nodes, the plurality of intermediate nodes, e.g. comprising the virtual machines (VMs), the selected number of target nodes, and the metrics between these nodes, it is possible to generate the connectivity graph, e.g. as a directed connectivity graph.

In step 805, the first communication path and the second communication path, e.g. forming a group of communication paths, can be determined or calculated between a source node, e.g. cell or base station, and a target node, e.g. server host or host server, which can then be used to place virtualized communication network functions. The communication paths might be evaluated based on metrics or weights related to different factors, such as delay, jitter, and/or available bandwidth. By default, the best communication paths can be defined to be the shortest communication paths, e.g. communication paths with the smallest latency.

The best communication path determination can be performed using a shortest path algorithm such as a Dijkstra's algorithm or a Bellman-Ford algorithm for a single-source shortest path problem, or a Viterbi algorithm using determined or measured metrics as observation input of the algorithm, e.g. considering a shortest stochastic path problem.

It is worth noting that this approach intends to determine a first communication path and a second communication path, e.g. forming group of communication paths, instead of simply a single shortest communication path, between a source node and a target node. One communication path may not be the shortest from an end-to-end point view, but may be optimal if the latency between the source node and an intermediate node is considered. By specifying a first communication path and a second communication path, e.g. forming a group of communication paths, extra candidate intermediate nodes can be taken into consideration for further selection processes that can be more suited for different node types and/or service types. This approach can realize the progressive placement concept.

In step 807, an intermediate node, e.g. comprising a virtual machine (VM), that is closest to a target node, e.g. a server host or host server, along the determined communication path, can be selected to provide a gateway function as a gateway node placement candidate. This may not be the final placement of the communication network function. The gateway function can comprise a service gateway function and/or a packet gateway function. The placement of the communication network function can be performed based on clustered and/or classified target nodes, e.g. host server clusters or host server groups. Different target nodes, e.g. servers, may be allocated with separate gateway functions in order to serve them.

Gateway functions can be placed as close to the corresponding target nodes, e.g. cache servers for video service sessions, as possible, e.g. within a predetermined distance. Gateway functions can be optimized based on characteristics of the target nodes, e.g. server host groups. For example, machine-to-machine (M2M) applications within a target node may not use bearer session updates and may be featured with short session durations. Two optimizations can be made. Firstly, disabling a session update signaling can be employed. Secondly, pre-establishing Internet protocol connectivity access network (IP-CAN) bearers towards machine-to-machine (M2M) servers can be employed, while keeping the bearer active, e.g. without using a bearer deletion.

In step 809, an intermediate node, e.g. comprising a virtual machine (VM), that is closest to a source node, e.g. base station, along the determined communication path, can be selected to provide a mobility management entity (MME) function as a mobility management entity (MME) node placement candidate. This may not be the final placement of the communication network function.

The placement can be optimized based on mobility patterns of communication network subscribers in order to minimize an overhead caused by mobility management entity (MME) changes in signaling procedures, such as handover and tracking area (TA) updates. More detailed approaches for this purpose are described in the following.

Handover signaling messages for user equipments (UEs) can be collected from existing centralized systems, and can be analyzed in order to cluster or group source nodes, e.g. base stations, based on the communication network subscriber mobility patterns, e.g. clustering or grouping source nodes, e.g. base stations, of a city to cover e.g. 80% of its subscribers. Clusters or groups of source nodes, e.g. base stations, can further be allocated to distributed mobility management entities (MMEs).

Mobility management entity (MME) functions can be optimized based on characteristics of the clusters or groups of source nodes, e.g. base stations. For example, machine-to-machine (M2M) applications, such as utility meters and healthcare devices, may be allocated to a particular mobility management entity (MME) function or instance. Different optimizations can be made. Firstly, mobility management entity (MME) sub-functions inside such mobility management entities (MMEs) may be disabled temporarily, may be deprioritized, or may be allocated with fewer virtualized resources. Secondly, a pre-establishment of Internet protocol connectivity access network (IP-CAN) bearers towards machine-to-machine (M2M) servers can be performed, while keeping the bearer active, e.g. without bearer deletion. The clustered or grouped source nodes can form the number of source nodes 703 described in conjunction with FIG. 7.

In step 811, varied intermediate nodes to be programmably arranged, e.g. with regard to a final placement of the communication network function, can be determined based on the selected or determined intermediate nodes, e.g. comprising candidate virtual machines (VMs). The intermediate nodes, e.g. comprising virtual machines (VMs), can e.g. be selected based on the factors of most virtualized resources for the communication network functions to be placed and the smallest failure recovery latency for each communication network function to be placed.

Resource availability criteria may be considered. Surplus virtualized resources can be calculated by subtracting virtualized resources employed by communication network functions to be placed and virtualized resources employed by existing further functions from total virtualized resources provided by a virtual machine (VM). A priority may be given to those intermediate nodes, e.g. comprising virtual machines (VMs), with maximum surplus virtualized resources.

Furthermore, failure recovery criteria may be considered. A latency with regard to failure recover communication network functions can be estimated, which can be prepared for failure recovery procedures based on live communication network function migration. A priority may be given to those intermediate nodes, e.g. comprising virtual machines (VMs), that are located closest to failure recovery servers within the communication network.

The approach can provide the following benefits. It can supporting a distributed mobility management entity function and a distributed gateway function by using a placement algorithm. It can provide an improved scalability, a reduced traffic overhead, and a reduced failure probability of a single point of failure. It can provide an optimized signaling performance by reducing an end-to-end communication latency, and can provide an optimized data plane performance by co-locating nodes having gateway functions with target nodes or content servers, such as cache servers. Furthermore, the approach can prepare the communication network for $5^{th}$ generation (5G) communication network services.

The approach can enable a dynamic placement of virtualized communication network functions. It can enable an infrastructural evolution from central anchors towards distributed nodes. It can support a distributed mobility management entity (MME) function and distributed packet gateways. It can provide a functional level placement, instead of a virtual machine (VM) level placement. A placement algorithm for sequential communication patterns, e.g. in signaling procedures, can be employed. A progressive placement algorithm can be used. A joint communication network function placement and performance optimization can be performed. The approach can be based on a multi-objective optimization with regard to a latency reduction, an overhead minimization, and/or virtualized resource availability. The approach can enable a functional simplification and adaptation by disabling and/or adapting communication network functions by clustering or grouping, by profiling, and by allocating loads. Furthermore, a targeted communication network function placement can be performed.

Embodiments relate to a network entity and a method for placement of virtualized communication network functions for an improved communication network performance, improved reliability, and improved resource efficiency.

The following abbreviations are used throughout the description: NFV denotes network function virtualization, VNF denotes virtualized network function, MANO denotes management and orchestration, eNB denotes evolved node B, MME denotes mobility management entity, sGW denotes service gateway, pGW denotes packet gateway, OSS denotes operations support system, and LTE denotes long term evolution.

What is claimed is:

1. A network apparatus for arranging an intermediate node for serving communications between a source node and a target node in a communication network comprising a plurality of intermediate nodes arranged in a plurality of communication paths between the source node and the target node, the network apparatus comprising:
    a metric determiner for determining a first metric of a first communication path from the plurality of communication paths, and for determining a second metric of a second communication path from the plurality of communication paths, the metric determiner being further configured to compare the first metric and the second metric and to select the communication path which is associated with the lesser metric to obtain a selected communication path for communications between the source node and the target node; and
    a processor configured to select the intermediate node arranged in the selected communication path to obtain a selected intermediate node, wherein the selected intermediate node comprises a virtual machine and is arranged within a predetermined distance with regard to the source node, and to arrange the selected intermediate node to provide a mobility management entity function.

2. The network apparatus of claim 1, wherein the metric determiner is configured to determine the first communication path and the second communication path from the plurality of communication paths.

3. The network apparatus of claim 1, wherein the processor is configured to select a further intermediate node arranged in the selected communication path to obtain a further selected intermediate node, and to arrange the further selected intermediate node.

4. The network apparatus of claim 1, further comprising a connectivity graph generator configured to generate a connectivity graph comprising the source node, the plurality of intermediate nodes, and the target node, the connectivity graph indicating communication connections between the source node, the plurality of intermediate nodes, and the target node.

5. The network apparatus of claim 4, wherein the metric determiner is configured to determine the first metric of the first communication path or the second metric of the second communication path upon the basis of the connectivity graph.

6. The network apparatus of claim 1, wherein the communication network comprises a plurality of source nodes, and wherein the metric determiner is configured to select the source node from the plurality of source nodes.

7. The network apparatus of claim 1, wherein the communication network comprises a plurality of target nodes, and wherein the metric determiner is configured to select the target node from the plurality of target nodes.

8. The network apparatus of claim 1, wherein:
the source node comprises a base station of the communication network; or
the target node comprises a host server of the communication network.

9. The network apparatus of claim 1, wherein the metric determiner is configured to determine a number of metrics between pairs of intermediate nodes, and to determine the first metric of the first communication path or the second metric of the second communication path upon the basis of the determined number of metrics.

10. The network apparatus of claim 1, wherein the first metric of the first communication path or the second metric of the second communication path comprises a latency metric, a bandwidth metric, or a data rate metric for communications between the source node and the target node.

11. A network apparatus for arranging an intermediate node for serving communications between a source node and a target node in a communication network comprising a plurality of intermediate nodes arranged in a plurality of communication paths between the source node and the target node, the network apparatus comprising:
a metric determiner for determining a first metric of a first communication path from the plurality of communication paths, and for determining a second metric of a second communication path from the plurality of communication paths, the metric determiner being further configured to compare the first metric and the second metric and to select the communication path which is associated with the lesser metric to obtain a selected communication path for communications between the source node and the target node; and
a processor configured to select the intermediate node arranged in the selected communication path to obtain a selected intermediate node, wherein the selected intermediate node comprises a virtual machine and is arranged within a predetermined distance with regard to the target node, and to arrange the virtual machine to provide a service gateway function or a packet gateway function.

12. The network apparatus of claim 11, wherein the metric determiner is configured to determine the first communication path and the second communication path from the plurality of communication paths.

13. The network apparatus of claim 11, wherein the processor is configured to select a further intermediate node arranged in the selected communication path to obtain a further selected intermediate node, and to arrange the further selected intermediate node.

14. The network apparatus of claim 11, further comprising a connectivity graph generator configured to generate a connectivity graph comprising the source node, the plurality of intermediate nodes, and the target node, the connectivity graph indicating communication connections between the source node, the plurality of intermediate nodes, and the target node.

15. The network apparatus of claim 14, wherein the metric determiner is configured to determine the first metric of the first communication path or the second metric of the second communication path upon the basis of the connectivity graph.

16. The network apparatus of claim 11, wherein the communication network comprises a plurality of source nodes, and wherein the metric determiner is configured to select the source node from the plurality of source nodes.

17. The network apparatus of claim 11, wherein the communication network comprises a plurality of target nodes, and wherein the metric determiner is configured to select the target node from the plurality of target nodes.

18. The network apparatus of claim 11, wherein:
the source node comprises a base station of the communication network; or
the target node comprises a host server of the communication network.

19. The network apparatus of claim 11, wherein the metric determiner is configured to determine a number of metrics between pairs of intermediate nodes, and to determine the first metric of the first communication path or the second metric of the second communication path upon the basis of the determined number of metrics.

20. The network apparatus of claim 11, wherein the first metric of the first communication path or the second metric of the second communication path comprises a latency metric, a bandwidth metric, or a data rate metric for communications between the source node and the target node.

21. A method for arranging an intermediate node for serving communications between a source node and a target node in a communication network comprising a plurality of intermediate nodes arranged in a plurality of communication paths between the source node and the target node, the method comprising:
determining a first metric of a first communication path from the plurality of communication paths;
determining a second metric of a second communication path from the plurality of communication paths;
comparing the first metric and the second metric;
selecting the communication path which is associated with the lesser metric to obtain a selected communication path for communications between the source node and the target node;
selecting the intermediate node arranged in the selected communication path to obtain a selected intermediate node, wherein the selected intermediate node comprises a virtual machine and is arranged within a predetermined distance with regard to the source node; and
arranging the selected intermediate node to provide a mobility management entity function.

22. A method for arranging an intermediate node for serving communications between a source node and a target node in a communication network comprising a plurality of intermediate nodes arranged in a plurality of communication paths between the source node and the target node, the method comprising:
determining a first metric of a first communication path from the plurality of communication paths;
determining a second metric of a second communication path from the plurality of communication paths;
comparing the first metric and the second metric;
selecting the communication path which is associated with the lesser metric to obtain a selected communication path for communications between the source node and the target node;
selecting the intermediate node arranged in the selected communication path to obtain a selected intermediate node, wherein the selected intermediate node comprises a virtual machine and is arranged within a predetermined distance with regard to the target node; and
arranging the selected intermediate node to provide one of a service gateway function or a packet gateway function.

* * * * *